United States Patent [19]
Hashimoto

[11] Patent Number: 5,658,121
[45] Date of Patent: Aug. 19, 1997

[54] ROBOT SYSTEM

[75] Inventor: Yoshiki Hashimoto, Hadano, Japan

[73] Assignee: Fanuc Ltd., Yamanashi, Japan

[21] Appl. No.: 502,360

[22] Filed: Jul. 14, 1995

[30] Foreign Application Priority Data

Jul. 25, 1994 [JP] Japan .................................. 6-172349
Aug. 5, 1994 [JP] Japan .................................. 6-184632

[51] Int. Cl.⁶ .................................................. B25J 9/00
[52] U.S. Cl. ................................... 414/744.1; 414/744.4; 901/17
[58] Field of Search ........................... 901/1, 9, 15, 16, 901/17; 414/744.5, 744.6, 680, 744.1

[56] References Cited

U.S. PATENT DOCUMENTS

| | | | |
|---|---|---|---|
| 3,654,613 | 4/1972 | Dunne et al. ........................... | 901/9 |
| 4,150,686 | 4/1979 | El Sherif et al. ....................... | 137/377 |
| 5,266,875 | 11/1993 | Slotine et al. .......................... | 901/4 |
| 5,332,013 | 7/1994 | Sugita et al. ........................... | 901/1 |
| 5,513,106 | 4/1996 | Yoshino et al. ........................ | 901/9 |
| 5,540,541 | 7/1996 | Gosdowski et al. ................... | 414/744.5 |

*Primary Examiner*—Karen B. Merritt
*Assistant Examiner*—Gregory A. Morse
*Attorney, Agent, or Firm*—Staas & Halsey

[57] ABSTRACT

A robot system has an enhanced cooling efficiency of the interior of a robot controller thereof. A robot mechanical unit has a base with an internal vacant space. The robot controller is arranged in close contact with the base of the robot mechanical unit, and a radiating fin of a servoamplifier arranged within the robot controller projects into the vacant space within the base. Most heat within such a robot controller is generated by the servoamplifier. The radiating fin dissipates the heat generated by the servoamplifier into the vacant space within the base of the robot mechanical unit. The base has a large surface area, which makes it possible to efficiently dissipate heat within it for cooling of the same. This improves the cooling efficiency of the interior of the robot controller.

4 Claims, 3 Drawing Sheets

ROBOT SYSTEM

BACKGROUND OF THE INVENTION

1. Field of the Invention

This invention relates to a robot system for carrying out a desired operation through control of a hand mounted on a wrist at an end of a robot arm thereof, and more particularly to a robot system of this kind having a robot mechanical unit and a robot controller integrally combined with each other.

2. Description of the Related Art

A conventional robot system comprises a robot mechanical unit including a robot arm and a robot controller which are provided as separate units and electrically connected to each other by a connector cable. Operation commands are given from the robot controller to direct the robot mechanical unit to carry out desired operations.

According to one conventional method of establishing the connection between the robot mechanical unit and the robot controller, the robot controller is installed at a location remote from the robot mechanical unit, and then a long connector cable is laid to connect the robot mechanical unit and the robot controller to each other. This method of connection between the robot mechanical unit and the robot controller, however, requires an additional space for installation of the robot controller, as well as a facility for protecting the connector cable. Therefore, provision of the robot mechanical unit and the robot controller at locations remote from each other by utilizing the long connector cable is not suitable for efficient utilization of a limited space and facility available for the robot system.

One solution to these inconveniences is to directly connect the robot mechanical unit and the robot controller to each other by respective connectors thereof. In doing this, the robot controller is installed adjacent to the robot mechanical unit in a dead space outside of the operation range of the robot arm.

FIG. 3 shows the construction of a conventional robot system of this kind. In FIG. 3, reference numeral 20a designates a robot controller received within a housing and installed adjacent to a robot mechanical unit 10a. A connector 30 provided on the robot controller 20a and a connector 31 provided on the back of a base 11a of the robot mechanical unit 10a are coupled to each other, thereby establishing the electrical connection between the robot controller 20a and the robot mechanical unit 10a.

The robot mechanical unit 10a including a robot arm is fixed to the floor by the base 11a thereof. Arranged on top of the base 11a is a swing device 18a with rotational axes J1 and J2, which has one end of a J2 arm 12a connected thereto. Further, one end of a J3 arm 13a is connected to the other end of the J2 arm 12a via a swing device 19a having a rotational axis J3. A wrist 14a is provided at the other end of the J3 arm 13a, and various kinds of hands can be mounted on the wrist 14a. The center of the wrist 14a is called the TCP (Tool Center Point). The operation range of the robot arm means a range of operation within which the TCP can be moved.

By reducing the size of the robot controller 20a such that it can be installed in a dead space outside the operation range of the robot arm, it is possible to arrange the robot controller 20a adjacent to the robot mechanical unit 10a. The applicant has already proposed a robot system of this kind by Japanese Patent Application No. 5-259635.

Generally, a robot controller contains a part generating much heat, such as a servoamplifier. To cool the interior of the robot controller, the controller is required to have a large radiating surface as a whole, or alternatively, it is necessary to carry out forced cooling by the use of a cooling fan or the like.

The robot controller installed adjacent to the robot mechanical unit is reduced in size as described above, and hence cannot secure a sufficiently large radiating surface. Further, a large cooling fan cannot be provided for forced air-cooling of such a robot controller reduced in size. Even if a small cooling fan is provided, it cannot achieve sufficient cooling effects, since a passage is also narrow through which air should be circulated by the operation of the cooling fan.

Thus, the robot controller of the type provided integrally with the robot mechanical unit has the inconvenience that it is difficult to cool the inside thereof due to the reduced size thereof.

Further, in spite of the fact that it is desired that the robot controller is reduced in size as much as possible to be installed in a limited space, it is difficult to reduce the size of the robot controller beyond a certain level since it contains a servoamplifier which generates much heat and has a large volume.

SUMMARY OF THE INVENTION

The present invention has been made in view of these circumstances, and one object thereof is to provide a robot system which has an enhanced cooling efficiency of the interior of a robot controller.

Further, the other object of the invention is to provide a robot system which is capable of reducing the size of a robot controller.

To attain the object, according to a first aspect of the present invention, there is provided a robot system for carrying out a desired operation through control of movement of a hand mounted on a wrist at one end of a robot arm thereof, which comprises a robot mechanical unit having a base with an internal vacant space, and a robot controller arranged in close contact with the base, wherein a radiating fin for cooling a servoamplifier within the robot controller projects into the internal vacant space of the base.

Most heat within a robot controller is generated by the servoamplifier. The radiating fin dissipates the heat from the servoamplifier into the internal vacant space within the base of the robot mechanical unit. Since the base has a large surface area, it is possible to efficiently dissipate heat within it for cooling of the robot controller.

This improves the cooling efficiency of the interior of the robot controller.

According to a second aspect of the present invention, there is provided a robot system for carrying out a desired operation through control of movement of a hand mounted on a wrist at one end of a robot arm thereof, which comprises a robot mechanical unit having a base within which a servoamplifier is received, and a robot controller electrically connected to the robot mechanical unit for controlling the robot mechanical unit.

The servoamplifier generates more heat than the other component parts within the robot controller. The arrangement of the servoamplifier within the base of the robot mechanical unit makes it unnecessary to provide a cooling fan for forced cooling of the interior of the robot controller, and it is not required to secure a large radiating surface, either. On the other hand, the heat generated by the servoamplifier is dissipated into the base. The base has a sufficiently large radiating surface, which makes it possible to efficiently dissipate heat within it. Therefore, it is possible to reduce the size of the robot controller.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The invention will now be described in detail with reference to the drawings showing embodiments of the invention.

Figure 1:
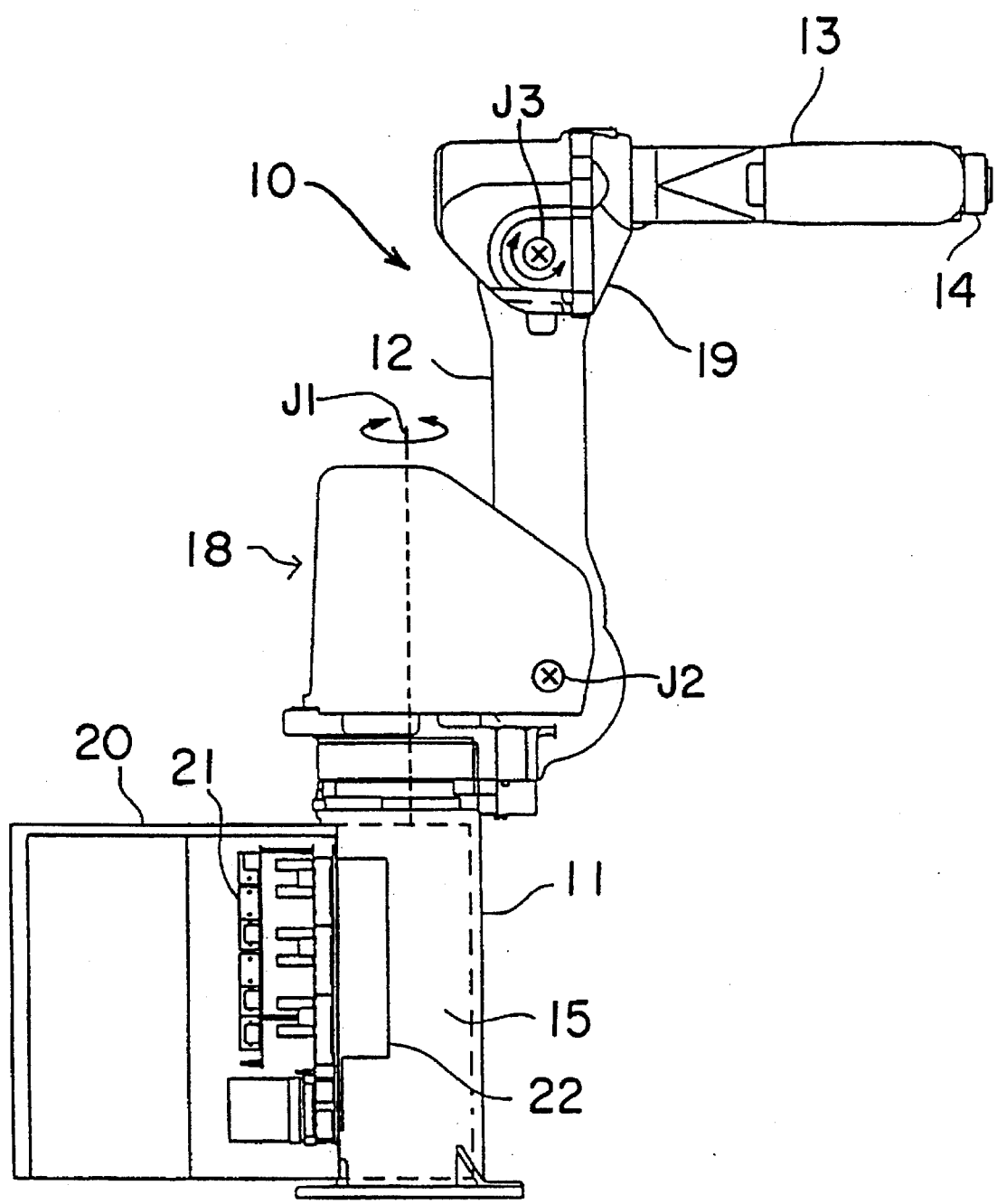
FIG. 1 is a diagram showing the construction of a robot system according to a first embodiment of the invention.

FIG. 1 shows the construction of a robot system according to a first embodiment of the invention. The robot system is comprised of a robot controller 20 and a robot mechanical unit 10 including a robot arm.

The robot mechanical unit 10 is fixed to the floor by a base 11, on which are mounted various operating blocks. First, arranged immediately on top of the base 11 is a swing device 18 with rotational axes J1 and J2, which has one end of a J2 arm 12 connected thereto. Further, one end of a J3 arm 13 is connected to the other end of the J2 arm 12 via a swing device 19 having a rotational axis J3. A wrist 14 is provided at the other end of the J3 arm 13, and various kinds of hands may be mounted on the wrist 14 for carrying out various operations. The center of the wrist 14, i.e. a TCP (Tool Center Point), can move within range of operation of the robot arm.

The base 11 has an internal vacant space 15, and the robot controller 20 is fixed in close contact with the back of the base 11. The robot controller 20 has a servoamplifier 21 arranged on an inner surface of a wall which is in contact with the robot mechanical unit 10. The servoamplifier 21 is provided with a radiating fin 22 which projects into the internal vacant space 15 of the base 11.

The servoamplifier 21 generates the largest amount of heat of all component parts within the robot controller 20. Therefore, an enhanced cooling efficiency of the servoamplifier 21 provides cooling effects significant enough to cool the whole robot controller 20 to a sufficient degree.

In the robot system constructed as above, the radiating fin 22 dissipates the heat generated by the servoamplifier 21 into the internal vacant space 15 of the base 11. The base 11 has a surface area large enough to dissipate heat generated by the servoamplifier 21. Therefore, the base 11 as a whole acts as an efficient radiator for dissipating heat within it, which makes it possible for a small-sized robot controller to obtain sufficient cooling effects therefrom. Further, the base 11 does not contain any component part susceptible to an elevated temperature, and hence no problem is caused by an elevation of temperature of the inside of the base 11.

Further, since heat generated by the servoamplifier 21 as a major heat generator within the robot controller 20 is dissipated into the base 11, it is possible to reduce the size of the robot controller 20. Since the interior of the robot controller 20 is prevented from being elevated in temperature, it is also possible to prevent malfunction of a processor and the like received within the robot controller 20. In other words, reliability of operation of the robot controller 20 is enhanced.

Further, the robot controller 20 is fixed such that it is fit in the base 11, which makes it possible to reduce the installation space of the whole robot system, thereby permitting an efficient utilization of a limited space within a factory. Further, the degree of freedom of layout of the robot system upon installation of the same is increased, whereby the productivity of the factory can be increased.

As described above, according to the first embodiment, the radiating fin of the servoamplifier of the robot controller is caused to project into the internal vacant space of the base of the robot mechanical unit, whereby it is made possible to increase the cooling efficiency of the robot controller.

Figure 2:
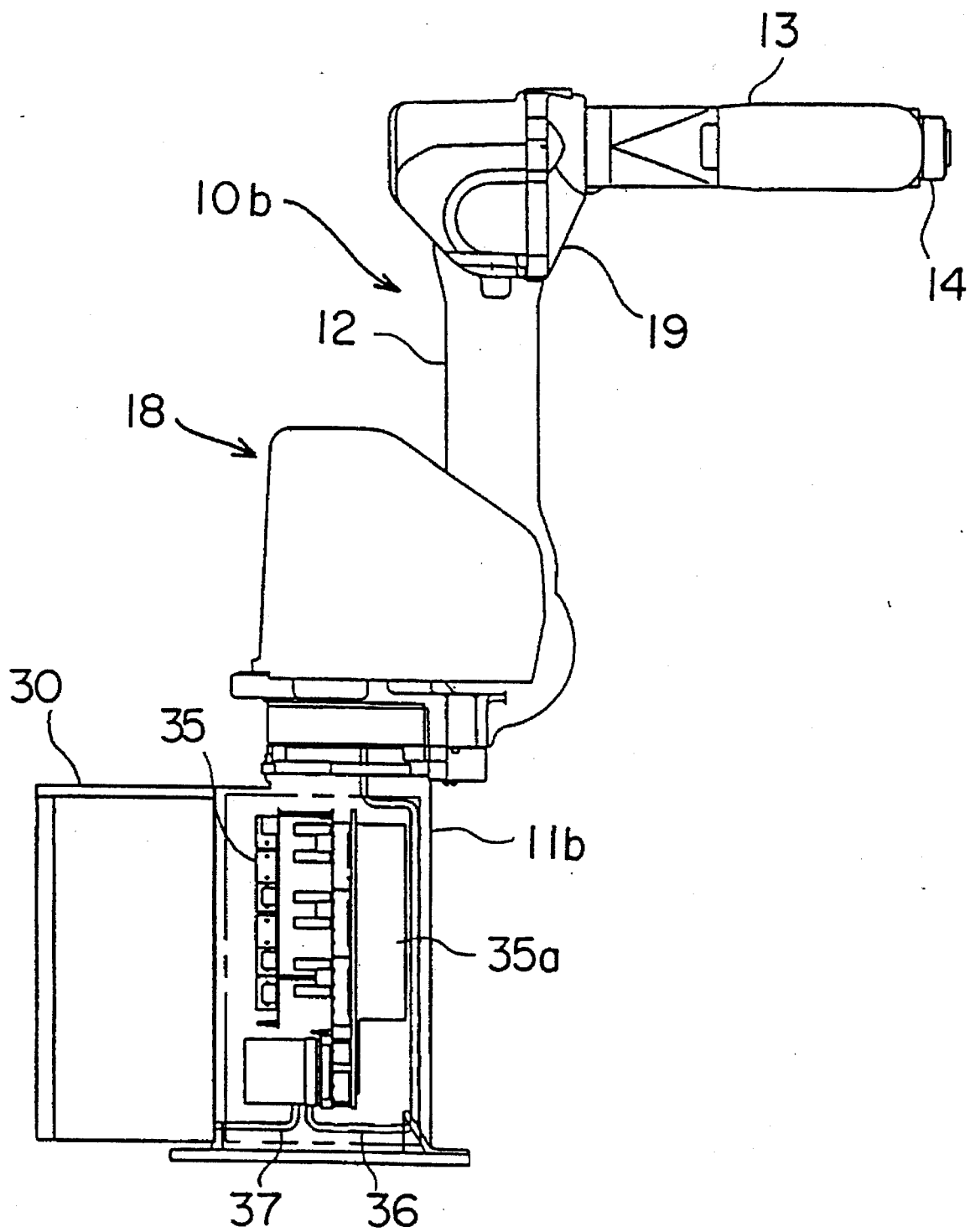
FIG. 2 is a diagram showing the construction of a robot system according to a second embodiment of the invention.
Figure 3:
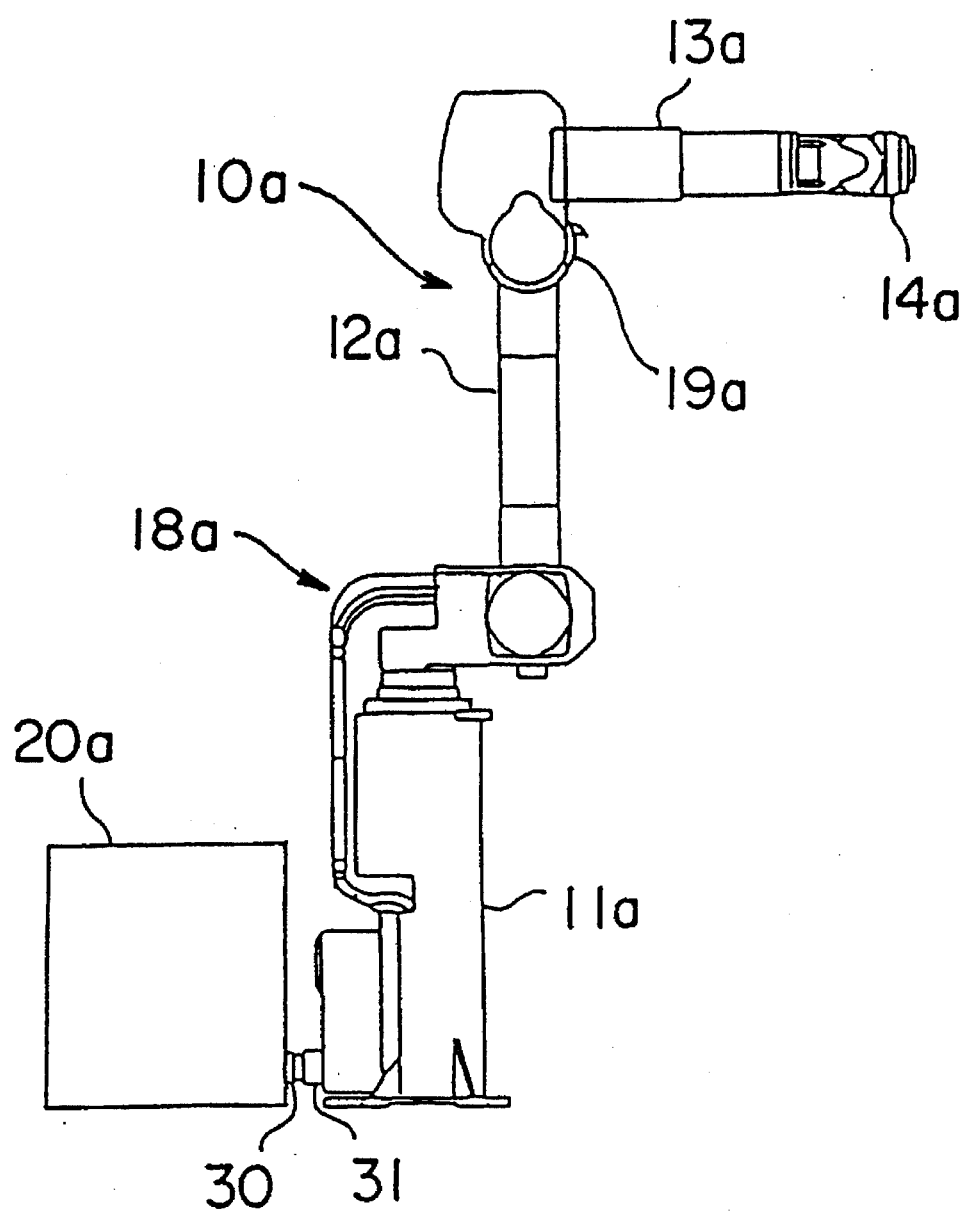
FIG. 3 is a diagram showing the construction of a conventional robot system.

FIG. 2 shows the construction of a robot system according to a second embodiment of the invention. The robot system is comprised of a robot controller 30 and a robot mechanical unit 10b including a robot arm.

The robot mechanical unit 10b has the same construction as the robot mechanical unit 10 of the first embodiment, except for a base 11b thereof.

The robot mechanical unit 10b is fixed to the floor by the base 11b thereof, on which are mounted various operating blocks. First, arranged immediately on top of the base 11b is a swing device 18 with rotational axes J1 and J2, which has one end of a J2 arm 12 connected thereto. Further, one end of a J3 arm 13 is connected to the other end of the J2 arm 12 via a swing device 19 having a rotational axis J3. A wrist 14 is provided at the other end of the J3 arm 13, and various kinds of hands may be mounted on the wrist 14 for carrying out various operations. The center of the wrist 14, i.e. a TCP (Tool Center Point), can move within a range of operation of the robot arm.

On the other hand, a servoamplifier 35 is received within the base 11b. The servoamplifier 35 is connected to motors through a connector cable 36 for operating the respective axes. Further, the servoamplifier 35 is provided with a radiating fin 35a for cooling the same.

The robot controller 30 is fixed in close contact with the back of the base 11b, and has a control circuit board and the like received therein. The robot controller 30 and the servoamplifier 35 are connected to each other by a connector cable 37. The connector cable 37 includes a cable for supplying power from the robot controller 30 to the servoamplifier 35, and transmission lines for transmitting control signals to the servoamplifier 35 for control thereof.

In the robot system constructed as above, no space is required for arranging the servoamplifier 35 within the robot controller 30, which makes it possible to reduce the size of the robot controller 30. Further, heat generated within the robot controller 30 is much less than heat generated by the servoamplifier 35. Therefore, it is not required to enlarge the radiating surface of the robot controller 30, and further not required to provide a cooling fan within the robot controller 30 for forced cooling of the same. As a result, it is possible to further reduce the size of the robot controller.

The reduction of size of the robot controller leads to reduction of weight of the same. The robot controller 30, which is reduced in weight, can be moved by a single operator, which leads to enhanced operation efficiency in installation, movement, and maintenance of the robot controller 30.

On the other hand, the radiating fin 35a dissipates the heat generated by the servoamplifier 35 into the space within the base 11b. The base 11b has a surface area large enough to dissipate heat generated by the servoamplifier 35. Therefore, the base 11b as a whole efficiently dissipates heat within it. Further, the base 11b does not contain any component part susceptible to an elevated temperature, and hence no problem is caused by an elevated temperature of the inside of the base 11.

Thus, there is no difficulty in reducing the size of the robot controller 30, which makes it possible to reduce the installation space for the whole robot system. The reduction of the installation space of the robot system permits efficient utilization of a limited space within a factory, which increases the degree of freedom of layout of the robot system upon installation thereof, whereby the productivity of the factory can be increased.

Further, heat generated within the robot controller 30 becomes very little, which prevents the temperature of the interior of the robot controller 30 from being elevated, whereby it is made possible to prevent malfunction of processors and the like received within the robot controller 30. That is, reliability of operation of the robot controller 30 is enhanced.

Further, if the servoamplifier 35 is arranged within the robot controller 30, the connector cable connecting between the robot controller 30 and the robot mechanical unit 10b is required to include a connector cable for connecting the servoamplifier 35 to respective motors. However, according to the second embodiment in which the servoamplifier 35 is arranged within the base 11b of the robot mechanical unit 10b, the connector cable connecting between the robot controller 30 and the robot mechanical unit 10b is only required for transmitting various control Signals and supplying power to the servoamplifiers 35. Therefore, the number of transmission lines within the connector cable can be smaller. Frequent plug-in and plug-out operations of connectors of a connector cable can cause contact failure of transmission lines, and the probability of occurrence of a fault, such as contact failure, becomes smaller for a connector cable containing the smaller number of transmission lines. That is, the smaller number of transmission lines leads to enhanced reliability of signals transmitted between the robot controller 30 and the robot mechanical unit 10b.

Although the above description has been made of a robot system in which the robot mechanical unit and the robot controller are integrated into one unit, it goes without saying that for a robot system in which a robot controller is installed at a location remote from a robot mechanical unit, it is also possible to reduce the size of the robot controller by arranging a servoamplifier within the base of the robot mechanical unit.

As described above, according to the second embodiment of the invention, it is possible to reduce the size of the robot controller, by provision of the servoamplifier within the base of the robot mechanical unit.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A robot system for carrying out a desired operation, comprising:

a robot mechanical unit having a base with an internal vacant space that substantially fills said base; and a robot controller including a servoamplifier housed therein, said controller being disposed in close contact with said base, wherein said servoamplifier is attached to a radiating fin for cooling said servoamplifier, said radiating fin projecting into said internal vacant space of said base.

2. A robot system for carrying out a desired operation through control of movement of a hand mounted on a wrist at one end of a robot arm thereof, comprising:

a robot mechanical unit having a base housing a servoamplifier; and a robot controller electrically connected to said robot mechanical unit for controlling said robot mechanical unit, wherein said base also houses a heat radiating fin extending into vacant internal space of said base, said heat radiating fin connected to said servoamplifier.

3. A robot system according to claim 2, wherein said robot controller is arranged in close contact with said base of said robot mechanical unit.

4. A robot system, including a robot, for carrying out a desired operation, comprising:

a base member supporting said robot;

a controller attached to said base member and housing a servoamplifier attached to a heat radiating fin, said heat radiating fin not being housed in said controller, wherein said base member is substantially empty except for said heat radiating fin that extends therein.

* * * * *